United States Patent
Wang et al.

(10) Patent No.: US 9,729,887 B2
(45) Date of Patent: Aug. 8, 2017

(54) MULTI-LAYER VIDEO CODING

(71) Applicant: QUALCOMM Incorporated, San Diego, CA (US)

(72) Inventors: Ye-Kui Wang, San Diego, CA (US); Fnu Hendry, Poway, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/749,534

(22) Filed: Jun. 24, 2015

(65) Prior Publication Data

US 2015/0381998 A1    Dec. 31, 2015

Related U.S. Application Data

(60) Provisional application No. 62/017,120, filed on Jun. 25, 2014.

(51) Int. Cl.
*H04B 1/66*      (2006.01)
*H04N 19/174*    (2014.01)
*H04N 19/70*     (2014.01)
*H04N 19/187*    (2014.01)
*H04N 19/423*    (2014.01)
*H04N 19/44*     (2014.01)
*H04N 19/129*    (2014.01)
*H04N 19/30*     (2014.01)
(Continued)

(52) U.S. Cl.
CPC ......... *H04N 19/174* (2014.11); *H04N 19/129* (2014.11); *H04N 19/187* (2014.11); *H04N 19/196* (2014.11); *H04N 19/30* (2014.11); *H04N 19/40* (2014.11); *H04N 19/423* (2014.11); *H04N 19/44* (2014.11); *H04N 19/513* (2014.11); *H04N 19/70* (2014.11)

(58) Field of Classification Search
CPC .. H04N 16/174; H04N 19/129; H04N 19/187; H04N 19/196; H04N 19/30; H04N 19/40; H04N 19/423; H04N 19/44; H04N 19/513; H04N 19/70
See application file for complete search history.

(56) References Cited

U.S. PATENT DOCUMENTS 8,472,731 B2    6/2013  Suzuki et al.
8,767,836 B2    7/2014  Hannuksela et al.
(Continued)

FOREIGN PATENT DOCUMENTS

WO    2015102959 A1    7/2015

OTHER PUBLICATIONS

Second Written Opinion from International Application No. PCT/US2015/037757, dated Jul. 4, 2016, 7 pp.
(Continued)

*Primary Examiner* — Tat Chio

(57) ABSTRACT

A device for encoding video data includes a memory configured to store at least a portion of a multi-layer bitstream of video data and one or more processors configured to determine that a supplemental enhancement information (SEI) message applies to more than one layer of the multi-layer video data; determine that the SEI message references a syntax element that has multiple instances associated with the more than one layer of the multi-layer video data; and set all of the multiple instances to a same value.

30 Claims, 8 Drawing Sheets

(51) Int. Cl.
    *H04N 19/513*      (2014.01)
    *H04N 19/196*      (2014.01)
    *H04N 19/40*       (2014.01)

(56) References Cited

U.S. PATENT DOCUMENTS

| | | | |
|---|---|---|---|
| 8,830,262 | B2 | 9/2014 | Haskell et al. |
| 9,161,032 | B2 | 10/2015 | Hannuksela et al. |
| 2008/0131079 | A1 | 6/2008 | Toma et al. |
| 2014/0092994 | A1 | 4/2014 | Wang |
| 2014/0218473 | A1 | 8/2014 | Hannuksela et al. |
| 2014/0301482 | A1* | 10/2014 | Narasimhan ........... H04N 19/70 375/240.26 |
| 2015/0103895 | A1* | 4/2015 | Deshpande .......... H04N 19/188 375/240.07 |
| 2015/0326865 | A1* | 11/2015 | Yin ........................ H04N 19/46 375/240.13 |
| 2015/0334399 | A1 | 11/2015 | Hendry et al. |
| 2015/0358633 | A1* | 12/2015 | Choi ..................... H04N 19/46 375/240.25 |
| 2015/0381991 | A1 | 12/2015 | Wang et al. |
| 2015/0381996 | A1 | 12/2015 | Wang et al. |
| 2015/0381997 | A1 | 12/2015 | Wang et al. |
| 2016/0050424 | A1 | 2/2016 | Choi et al. |
| 2016/0065983 | A1 | 3/2016 | Choi et al. |
| 2016/0156914 | A1 | 6/2016 | Suehring et al. |
| 2016/0323590 | A1 | 11/2016 | Li et al. |
| 2016/0353115 | A1 | 12/2016 | Samuelsson et al. |
| 2017/0013259 | A1 | 1/2017 | Li et al. |

OTHER PUBLICATIONS

Response to Second Written Opinion dated Jul. 4, 2016, from International Application No. PCT/US2015/037757, filed on Aug. 31, 2016, 15 pp.
International Preliminary Report on Patentability from International Application No. PCT/US2015/037757, dated Sep. 29, 2016, 7 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "High Efficiency Video Coding (HEVC) Scalable Extensions Draft 5", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1008-v4, Jan. 22, 2014, KP030115882, 125 pp.
Hannuksela "Version 1/MV-HEVC/SHVC HLS: Access unit boundary detection", JCT-VC Meeting; Jan. 9-17, 2014; San Jose; (Joint Collaborative Team on Video Coding of ISO/IEC JTC1/SC29/WG11 and ITU-T SG.16), No. JCTVC-P0043, Dec. 19, 2013, XP030115504, 4 pp.
Hannuksela, "MV-HEVC/SHVC HLS: On frame-field related indications (follow-up of parts of JCTVC-Q0183/JCT3V-H0082 and JCTVC-Q0078/JCT3V-H0026)", JCT-3V Meeting; Mar. 27-Apr. 4, 2014; Valencia; (The Joint Collaborative Team on 3D Video Coding Extension Development of ISO/IEC JTC1/SC29/WG11 and ITU-T SG.16); URL: http://phenix.int-evry.fr/jct2/, No. JCT3V-H0206, Apr. 2, 2014; 4 pp. XP030132284.
Hannuksela, "MV-HEVC/SHVC HLS: On additional layer sets; rewriting of simulcast layers; and profile-tier-level indication for auxiliary picture layers", JCT-3V Meeting; Mar. 27-Apr. 4, 2014; Valencia; (The Joint Collaborative Team on 3d Video Coding Extension Development of ISO/IEC JTC1/SC29/WG11 and ITU-T SG.16); URL: http://phenix.int-evry.fr/jct2/, No. JCT3V-H0026, Mar. 18, 2014, XP030132075, 7 pp.
He, et al., "MV-HEVC/SHVC HLS: On Sub-Bitstream Extraction and Re-Writing Process", JCT-3VMEETING; Nov. 1, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/, No. JCT3V-G0160-v3, Jan. 13, 2014, XP030131944, 8 pp.
Hendry, et al., "MV-HEVC/SHVC HLS: More miscellaneous cleanups", JCT-VC Meeting; Apr. 21-27, 2007; Sapporo; (Joint Collaborative Team on Video Coding of ISO/IEC JTC1/SC29/WG11 and ITU T SG.16 ); URL: http://wftp3.itu.int/av-arch/jctvc-site/,, No. JCTVC-R0279, Jun. 26, 2014; XP030116592, 5 pp.
"Joint Draft 10: Scalable Video Coding", JVT Meeting; MPEG Meeting; Apr. 21-27, 2007; San Josa CR ,US; (Joint Video Team of ISO/IEC JTC1/SC29/WG11 and ITU-T SG.16 ), No. JVT-W201, Jun. 8, 2007, XP030007102, 567 pp. [uploaded in parts].
Sullivan, "JCT-VC AHG report: Layered coding constraint specifications and capability indications (AHG10)", JCT-VC Meeting; Jun. 30-Jul. 9, 2014; Sapporo; (Joint Collaborative Team on Video Coding of ISO/IEC JTC1/SC29/WG11 and ITU-T SG.16); URL:

(56) References Cited

OTHER PUBLICATIONS http://wftp3.itu.int/av-arch/jctvc-site/, No. JCTVC-R0010-v3, Jun. 20, 2014, 38 pp. XP030116259, 38 pp.

Wang, et al., "MV-HEVC/SHVC HLS: SEI message cleanups", JCT-3V Meeting; Mar. 27-Apr. 4, 2014; Valencia; (The Joint Collaborative Team on 3D Video Coding Extension Development of ISO/IEC JTC1/SC29/WG11 and ITU-T SG.16); URL: http://phenix.int-evry.fr/jct2/, No. JCT3V-H0082, Mar. 25, 2014, XP030132140, 6 pp.

Wiegand, et al., "The H.264 : MPEG-4 AVC Video Coding Standard", Jan. 20, 2004, XP055208822, Retrieved from the Internet: URL: http://ip.hhi.de/imagecom_G1/assets/pdfs/H264_03.pdf; 51 pp.

Sullivan, et al., "Ad hoc group report: Layered coding constraint specifications and capability indications (AHG10)," JCT-VC Meeting; Jun. 30-Jul. 9, 2014, No. JCTVC-R0010, version 3, Jun. 21, 2014; 40 pp.

Wang, et al. "High Efficiency Video Coding (HEVC) Defect Report 4," JCT-VC Meeting; (Joint Collaborative Team on Video Coding of ISO/IEC JTC1/SC29/WG11 and ITU-T SG.16); Mar. 27-Apr. 4, 2014; No. JCTVC-Q1003 (v.1), May 28, 2014; 314 pp.

Tech, et al., "MV-HEVC Draft Text 8," JCT-3V Meeting; (Joint Collaborative Team on Video Coding of ISO/IEC JTC1/SC29/WG11 and ITU-T SG.16); Mar. 29-Apr. 4, 2014; No. JCT3V-H1002_v5, Jun. 3, 2014; 164 pp.

Chen, et al., "Preliminary version of High efficiency video coding (HEVC) scalable extension Draft 6," JCT-VC Meeting; (Joint Collaborative Team on Video Coding of ISO/IEC JTC1/SC29/WG11 and ITU-T SG.16); No. JCTVC-Q1008_v2, May 10, 2014;160 pp.

Tech, et al., "MV-HEVC Draft Text 7," JCT-3V Meeting; (Joint Collaborative Team on Video Coding of ISO/IEC JTC1/SC29/WG11 and ITU-T SG.16); No. JCT3V-G1004_v7, Jan. 11-17, 2014; Feb. 28, 2014; 131 pp.

Bross, et al., "High Efficiency Video Coding (HEVC) text specification draft 9," JCT-VC Meeting; (Joint Collaborative Team on Video Coding of ISO/IEC JTC1/SC29/WG11 and ITU-T SG.16); Oct. 10-19, 2012; No. JCTVC-K1003_v1, 281 pp. [uploaded in parts].

ITU-T H.223, Series H: Audiovisual and Multimedia Systems, Infrastructure of audiovisual services—Transmission multiplexing and synchronization, Multiplexing protocol for low bit rate multimedia communication; The International Telecommunication Union. Jul. 2001, 74 pp.

International Search Report and Written Opinion from International Application No. PCT/US2015/037757, dated Sep. 18, 2015, 13 pp.

Response to Written Opinion dated Sep. 18, 2015 from International Application No. PCT/US2015/037757, filed on Apr. 25, 2016, 5 pp.

Bross., et al., "High Efficiency Video Coding (HEVC) Text Specification Draft 9", JCTVC-K1003, Joint Collaborative Team on Video Coding(JCT-VC) 11th Meeting, Oct. 10-19, 2012, Shanghai, CN, V1, Oct. 21, 2012, 281 pp.

\* cited by examiner

MULTI-LAYER VIDEO CODING

This Application claims the benefit of U.S. Provisional Application 62/017,120, filed 25 Jun. 2014, the entire content of which is incorporated herein by reference.

TECHNICAL FIELD

This disclosure relates to video coding and compression and signaling of data associated with compressed video in a bitstream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure introduces techniques related to multi-layer video coding, and more particularly, techniques related to aspects of multi-layer video coding including a representation format for independent non-base layers (INBLs). This disclosure also introduces techniques for determining which SPS or PPS is used for interpretation of certain SEI messages and to access unit delimiters.

In one example, a method of encoding multi-layer video data includes determining that a supplemental enhancement information (SEI) message applies to more than one layer of the multi-layer video data; determining that the SEI message references a syntax element that has multiple instances associated with the more than one layer of the multi-layer video data; and setting all of the multiple instances to a same value.

In another example, a device for encoding video data includes a memory configured to store at least a portion of a multi-layer bitstream of video data and one or more processors configured to determine that a supplemental enhancement information (SEI) message applies to more than one layer of the multi-layer video data; determine that the SEI message references a syntax element that has multiple instances associated with the more than one layer of the multi-layer video data; and set all of the multiple instances to a same value.

In another example, an apparatus for encoding multi-layer video data includes means for determining that a supplemental enhancement information (SEI) message applies to more than one layer of the multi-layer video data; means for determining that the SEI message references a syntax element that has multiple instances associated with the more than one layer of the multi-layer video data; and means for setting all of the multiple instances to a same value.

In another example, a computer readable storage medium stores instructions that when executed by one or more processors cause the one or more processors to determine that a supplemental enhancement information (SEI) message applies to more than one layer of the multi-layer video data; determine that the SEI message references a syntax element that has multiple instances associated with the more than one layer of the multi-layer video data; and set all of the multiple instances to a same value.

The details of one or more examples of the disclosure are set forth in the accompanying drawings and the description below. Other features, objects, and advantages will be apparent from the description, drawings, and claims.

DETAILED DESCRIPTION

Figure 1:
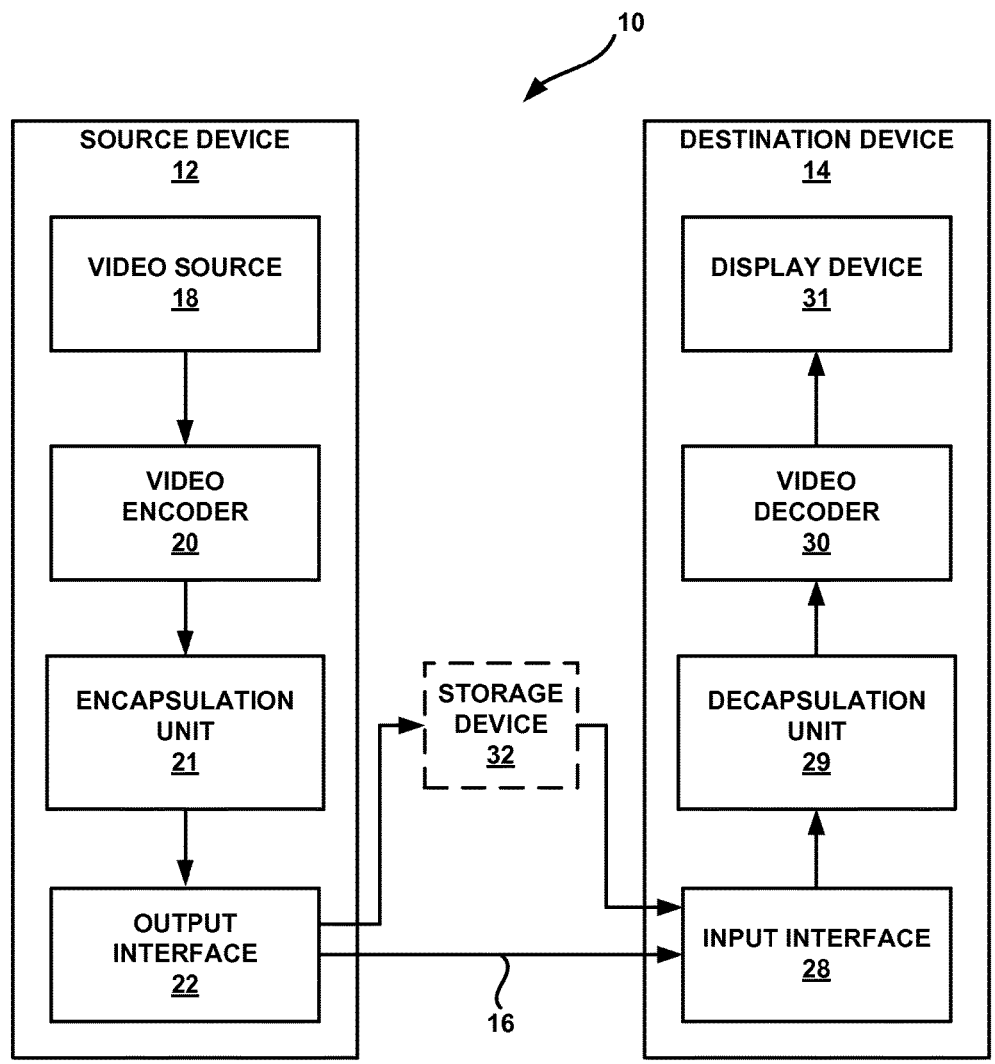
FIG. 1 is a block diagram illustrating an example video encoding and decoding system that may utilize the techniques described in this disclosure.

This disclosure introduces techniques related to multi-layer video coding, and more particularly, techniques related to aspects of multi-layer video coding including a representation format for independent non-base layers (INBLs). This disclosure also introduces techniques for determining which SPS or PPS is used for interpretation of certain SEI messages and to access unit delimiters.

This disclosure includes techniques for applying supplemental enhancement information (SEI) messages that are defined in the High Efficiency Video Coding (HEVC) standard in a multi-layer context. In some instances, the techniques may be performed with multi-layer extensions to the HEVC standard such as a Multi-view Video Coding extension to HEVC (MV-HEVC) or a Scalable Video Coding (SVC) extension to HEVC (SHVC), as noted below. While the techniques of this disclosure will generally be described using HEVC terminology, the techniques of this disclosure are not necessarily limited to any particular video coding standard and may additionally or alternatively be used with other extensions to HEVC, other multi-view coding standards, and/or other multi-layer video coding standards. Additionally, unless stated otherwise, it should be assumed that the techniques of this disclosure, as described below, may be applied independently or in combination.

A "layer" of video data may generally refer to a sequence of pictures having at least one common characteristic, such as a view, a resolution, a fidelity, an auxiliary representation, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and vice versa, and a plurality of views or a plurality of scalable layers may be referred to, in a similar manner, as multiple layers, e.g., in a multi-layer coding system. In addition, a multi-layer codec (also referred to as a multi-layer video coder or multi-layer encoder-decoder) may refer to a multi-view codec or a scalable codec (e.g., a codec configured to encode and/or decode video data using MV-HEVC, SHVC, or another multi-layer coding technique).

A picture may be either a frame or a field, where a field refers to alternative rows (e.g. even rows or odd rows) of a frame, and where a frame refers to the composition of two fields, such as an even field (also referred to as a top field) and an odd field (also referred to as a bottom field). Although this disclosure will generally describe techniques with reference to pictures or frames, it should be understood that unless explicitly stated otherwise, the techniques described may also be applicable to fields.

The HEVC standard generally defines a layer as a set of network abstraction layer (NAL) units that all have a particular value of nuh_layer_id and the associated non-video coding layer (VCL) NAL units, or one of a set of syntactical structures having a hierarchical relationship. The HEVC standard generally defines a NAL unit as a syntax structure containing an indication of the type of data included in the NAL unit and bytes containing that data in the form of a raw byte sequence payload (RBSP). The syntax element "nuh_layer_id" identifies the layer to which the NAL units belong.

A multi-layer bitstream may include a base layer and one or more non-base layers, e.g., in SHVC, or a plurality of views, e.g., in MV-HEVC. In a scalable bitstream, the base layer may typically have a layer identifier (e.g. nuh_layer_id) that is equal to zero. A non-base layer may have a layer identifier that is greater than zero and may provide additional video data that is not included in the base layer. For example, a non-base layer of multi-view video data may include an additional view of video data. A non-base layer of scalable video data may include an additional layer of scalable video data. A non-base layer may be interchangeably referred to as an enhancement layer.

An access unit (sometimes abbreviated as AU) of a multi-layer bitstream is, generally, a unit of data including all layer components (e.g., all NAL units) for a common temporal instance. The layer components of an access unit are typically intended to be output together (i.e., output substantially simultaneously), where outputting a picture generally involves transferring pictures from a decoded picture buffer (DPB) (e.g., storing pictures from the DPB to an external memory, sending the pictures from the DPB to a display, or the like). The HEVC standard, including the SHVC and MV-HEVC extensions, generally defines an access unit as a set of NAL units that are associated with each other according to a specified classification rule, are consecutive in decoding order, and contain at most one coded picture with any specific value of nuh_layer_id. In addition to containing the VCL NAL units of the coded pictures, an access unit may also contain non-VCL NAL units. The decoding of an access unit results in at most one decoded picture with any specific value of nuh_layer_id. A certain sequence of access units may be referred to as a coded video sequence (CVS).

A bitstream containing an encoded representation of video data may include a series of NAL units. The NAL units may include VCL NAL units and non-VCL NAL units. The VCL NAL units may include coded slices of pictures. A non-VCL NAL unit may, for example, encapsulate other information, such as a video parameter set (VPS), a sequence parameter set (SPS), a picture parameter set (PPS), one or more SEI messages, or other types of data.

NAL units of the bitstream may be associated with different layers of the bitstream. In SHVC, as noted above, the layers other than a base layer may be referred to as "enhancement layers" and may include data that improve the quality of playback of the video data. In multi-view coding and 3-dimensional video (3DV) coding, such as MV-HEVC, the layers may include data associated with different views. Each layer of the bitstream is associated with a different layer identifier.

In addition, NAL units may include temporal identifiers. Each operation point of a bitstream has a set of layer identifiers and a temporal identifier. If a NAL unit specifies a layer identifier in the set of layer identifiers for an operation point and the temporal identifier of the NAL unit is less than or equal to the temporal identifier of the operation point, the NAL unit is associated with the operation point.

The SEI mechanism supported in both H.264/AVC and HEVC enables video encoders to include such metadata in the bitstream that is not required for correct decoding, by a video decoder or other device, of the sample values of the output pictures, but can be used for various other purposes, such as picture output timing, displaying, as well as loss detection and concealment. A NAL unit that encapsulates one or more SEI messages is referred to herein as a SEI NAL unit. One type of SEI message is a scalable nesting SEI message. A scalable nesting SEI message is an SEI message that contains one or more additional SEI messages. The scalable nesting SEI message may be used to indicate whether an SEI message applies to particular layers or temporal sub-layers of a multi-layer bitstream. An SEI message that is not contained in a scalable nesting SEI message is referred to herein as a non-nested SEI message.

Certain types of SEI messages contain information that is only applicable to particular operation points. An operation point of a bitstream is associated with a set of layer identifiers and a temporal identifier. An operation point representation may include each NAL unit that is associated with an operation point. An operation point representation may have a different frame rate and/or bit rate than an original bitstream. This is because the operation point representation may not include some pictures and/or some of the data of the original bitstream.

This disclosure further includes techniques related to access unit delimiter (AUD) NAL units. According to the HEVC standard, an AUD NAL unit may be used to indicate the type of slices present in a coded picture and to simplify the detection of the boundary between access units. There is no normative decoding process associated with the access unit delimiter.

As will be explained in greater detail below, indicating the representation format of video data, determining which SPS or PPS is used for interpretation of certain SEI messages, and the interpretation of AUD NAL units presents several challenges in multi-layer video that are not present in single-layer video. This disclosure introduces techniques that may address those challenges.

FIG. 1 is a block diagram illustrating an example video encoding and decoding system 10 that may utilize the techniques described in this disclosure. System 10 may be configured to encode, encapsulate, transmit, decapsulate, and decode multi-layer video data. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, wireless/cellular telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. In some implementations, source device 12 and destination device 14 may be mobile network devices configured to communicate over a mobile network.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. The communication medium may also form part of a cellular or mobile network, and source device 12 and destination device 14 may be configured to communicate using a mobile, sometimes also called a cellular, communication standard such as a GSM network, CDMA network, LTE network, or other such network.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, encapsulation unit 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. Encapsulation unit 21 may form one or more representations of the multimedia content, where each of the representations may include one or more layers. In some examples, video encoder 20 may encode each layer in different ways, e.g., with different frame rates, different bit rates, different resolutions, or other such differences. Thus, encapsulation unit 21 may form various representations having various characteristics, e.g., bit rate, frame rate, resolution, and the like.

Each of the representations may correspond to respective bitstreams that can be retrieved by destination device 14. Encapsulation unit 21 may provide an indication of a range of view identifiers (view_ids) for views included in each representation, e.g., within a media presentation description (MPD) data structure for the multimedia content. For example, encapsulation unit 21 may provide an indication of a maximum view identifier and a minimum view identifier for the views of a representation. The MPD may further provide indications of maximum numbers of views targeted for output for each of a plurality of representations of the multimedia content. The MPD or data thereof may, in some examples, be stored in a manifest for the representation(s).

The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, decapsulation unit 29, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Decapsulation unit 29 of destination device 14 may represent a unit that decapsulates SEI messages from a bitstream (or a subset of a bitstream, referred to as an operation point in the context of multi-layer coding). Decapsulation unit 29 may perform operations in an order opposite to those performed by encapsulation unit 21 to decapsulate data from the encapsulated encoded bitstream, such as SEI messages.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In other examples, video encoder 20 and video decoder 30 may operate according to HEVC developed by the Joint Collaboration Team on Video Coding (JCT-VC) of ITU-T Video Coding Experts Group (VCEG) and ISO/IEC Motion Picture Experts Group (MPEG).

Furthermore, there are ongoing efforts to produce scalable video coding, multi-view coding, and 3DV extensions for HEVC. The scalable video coding extension of HEVC may be referred to as SHVC. A recent Working Draft (WD) of SHVC (referred to as SHVC WD5 or the current SHVC WD hereinafter), is described in Chen et al., "High Efficiency Video Coding (HEVC) scalable extension draft 5," Joint Collaborative Team on Video Coding (JCT-VC) of ITU-T SG16 WP3 and ISO/IEC JTC1/SC29/WG11, document JCTVC-P1008_v4, $16^{th}$ Meeting, San Jose, January 2014. A recent Working Draft (WD) of MV-HEVC (referred to as MV-HEVC WD7 or the current MV-HEVC WD hereinafter) is described in Tech et al., "MV-HEVC Draft Text 7," Joint Collaborative Team on Video Coding (JCT-VC) of ITU-T SG16 WP3 and ISO/IEC JTC1/SC29/WG11, document JCTVC-G1004_v7, $16^{th}$ Meeting, San Jose, January 2014.

In HEVC and other video coding specifications, a video sequence typically includes a series of pictures. Pictures may also be referred to as "frames." A picture may include three sample arrays, denoted $S_L$, $S_{Cb}$, and $S_{Cr}$. . . . $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks.

A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. As noted above, an access unit includes a set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. Example types of view components include texture view components and depth view components.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

The SEI mechanism supported in both H.264/AVC and HEVC enables video encoders (e.g., video encoder 20) to include such metadata in the bitstream that is not required for correct decoding of the sample values of the output pictures, but can be used for various other purposes, such as picture output timing, displaying, as well as loss detection and concealment. Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may generate one or more SEI NAL units for inclusion in an access unit. In other words, any number of SEI NAL units may be associated with an access unit. Furthermore, each SEI NAL unit may contain one or more SEI messages. That is, video encoders can include any number of SEI NAL units in an access unit, and each SEI NAL unit may contain one or more SEI messages. A SEI NAL unit may include a NAL unit header and a payload. The NAL unit header of the SEI NAL unit includes at least a first syntax element and a second syntax element. The first syntax element specifies a layer identifier of the SEI NAL unit. The second syntax element specifies a temporal identifier of the SEI NAL unit.

A nested SEI message refers to an SEI message that is contained in a scalable nesting SEI message. A non-nested SEI message refers to an SEI message that is not contained in a scalable nesting SEI message. The payload of the SEI NAL unit may comprise a nested SEI message or a non-nested SEI message.

The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages.

Table 1, below, lists SEI messages specified in HEVC and briefly describes their purposes:

TABLE 1

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation, as well as picture structure related information |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |

TABLE 1-continued

Overview of SEI messages

| SEI message | Purpose |
| --- | --- |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

As introduced above, this disclosure introduces techniques related to multi-layer video coding, and more particularly, to techniques related to aspects of multi-layer video coding including representation format of independent non-base layers (INBLs), which SPS or PPS is used for interpretation of certain SEI messages, and the processing of AUD NAL units.

Video encoder 20 may be configured to generate multi-layer video data, and video decoder 30 may be configured to decode multi-layer video data. The multi-layer video data may include a base layer as well as one or more non-base layers. The non-base layers may include both dependent base layers, which are dependent on other layers for decoding, and INBLs, which are not dependent on other layers for decoding. Existing implementations of INBLs in multi-layer video coding include some potential problems.

As one example of a potential problem with existing implementations, a layer with a layer identifier (e.g. nuh_layer_id) greater than 0, regardless of whether the layer is an INBL, uses the representation format signalled in the VPS. The representation format includes parameters such as width, height, bit depth, and color format. If an INBL that refers to an SPS with V1CompatibleSPSFlag equal to 1 or nuh_layer_id equal to 0 is to be rewritten to be an HEVC version 1 compatible base layer, e.g. as specified in the AHG10 output text in JCTVC-R0010v3/JCT3V-I0010v3 (http://phenix.int-evry.fr/jct/doc_end_user/documents/18_Sapporo/wg11/JCTVC-R0010-v3.zip), when the used representation format from the VPS is different from the representation format (for any of the parameters) signalled in the SPS, then the rewriting process needs to change the SPS such that the representation format is the same as the used representation format from the VPS. This requirement may necessitate rewriting of the entire SPS, which may make the entire rewriting process of the INBL into an HEVC version 1 compatible base layer significantly more complicated.

When V1CompatibleSPSFlag is equal to 1, then the SPS is compatible with the SPS syntax specified in HEVC version 1 and can be parsed by legacy HEVC decoders implemented according to HEVC version 1. When V1CompatibleSPSFlag is equal to 0, then the SPS is not compatible with the SPS syntax specified in HEVC version 1 and cannot be parsed by legacy HEVC decoders implemented according HEVC version 1.

This disclosure introduces several techniques that may address the issue described above. As one example, video encoder 20 may be configured to encode multi-layer video such that the used representation format from the VPS and the representation format signalled in the SPS for the INBL are identical. Additionally or alternatively, for an INBL that is contained in a bitstream partition that includes only the INBL, the specified representation format is the representation format signalled in the active SPS. Additionally or alternatively, for any INBL, the specified representation format may be the representation format signalled in the active SPS for the layer.

As another example of a potential problem with existing implementations of multi-layer video, an SEI message may apply to multiple layers or an (output) operation point associated with a (output) layer set containing multiple layers, e.g. when the SEI message is nested. In such an instance, there can be multiple active SPSs and multiple active PPSs. There may, for example, be an active SPS and an active PPS for each layer, which may make it unclear to which PPS or SPS some SEI messages apply.

For example, the flags "general_progressive_source_flag" and "general_interlaced_source_flag" are referred to in the semantics of ffinfo_source_scan_type in a frame-field information SEI message. These two flags are located in the profile, tier and level (PTL) syntax structure, which can be in each of the active SPSs and multiple instances of the flags may be present in the VPS as well. Therefore, it should be clarified which PTL syntax structure containing the two flags applies when the frame-field information SEI message applies to multiple layers. Similar issues exist for the SPS flag "field_seq_flag" that is used in the semantics of ffinfo_pic_struct and ffinfo_duplicate_flag in the frame-field information SEI message.

To potentially solve the problem described above, this disclosure introduces an encoding restriction that may require that the value of field_seq_flag be the same for all active SPSs for the layers to which the frame-field information SEI message applies. Additionally or alternatively, this disclosure introduces an encoding restriction that may require that the frame-field information SEI message that applies to a set of layers not be present if the value of field_seq_flag is not the same for all active SPSs for the layers. In HEVC, field_seq_flag equal to 1 indicates that the CVS conveys pictures that represent fields, and specifies that a picture timing SEI message shall be present in every access unit of the current CVS. In HEVC, field_seq_flag equal to 0 indicates that the CVS conveys pictures that represent frames and that a picture timing SEI message may or may not be present in any access unit of the current CVS.

Similarly, for the flags "general_progressive_source_flag" and "general_interlaced_source_flag," this disclosure introduces an encoding restriction that may require the flags to be identical, respectively, for all the PTL syntax structures that apply to the bitstream partitions that contain the layers to which the frame-field information SEI message applies. According to HEVC, the general_progressive_source_flag and general_interlaced_source_flag are interpreted as follows:

If general_progressive_source_flag is equal to 1 and general_interlaced_source_flag is equal to 0, the source scan type of the pictures in the CVS should be interpreted as progressive only.

Otherwise, if general_progressive_source_flag is equal to 0 and general_interlaced_source_flag is equal to 1, the source scan type of the pictures in the CVS should be interpreted as interlaced only.

Otherwise, if general_progressive_source_flag is equal to 0 and general_interlaced_source_flag is equal to 0, the source scan type of the pictures in the CVS should be interpreted as unknown or unspecified.

Otherwise (general_progressive_source_flag is equal to 1 and general_interlaced_source_flag is equal to 1), the source scan type of each picture in the CVS is indicated at the picture level using the syntax element source_scan_type in a picture timing SEI message. Similar restrictions may apply for syntax elements of other SEI messages as well. For any SEI message seiA that applies to multiple layers or multiple (output) layer sets, when multiple instances of any syntax element that is not part of seiA are involved in the semantics of any syntax element that is part of seiA, it is required that the value of the syntax element that is not part of seiA is the same for all the instances. Therefore, if video encoder 20 determines that a SEI message applies to more than one layer of multi-layer video data and determines that the SEI message references a syntax element that has multiple instances associated with the more than one layer of the multi-layer video data; then video encoder 20 sets all of the multiple instances to a same value. The syntax element may be any of a field_seq_flag syntax element, a general_progressive_source_flag syntax element, a general_interlaced_source_flag syntax element, or any other such syntax element described herein.

As introduced above, this disclosure also introduces several techniques related to AUD NAL units, which as presently implemented have some potential shortcoming when used in conjunction with multi-layer video. The semantics of the syntax element "pic_type" in an AUD NAL unit may not be clear in multi-layer contexts such as in a multi-layer bitstream. An access unit in a multi-layer context may contain one or more coded pictures, yet the semantics of pic_type says that it may be used to indicate the type of slices present in "a coded picture." Therefore, in multi-layer video context, where there are potentially more than one picture in an access unit, the current semantics are unclear.

To address this potential shortcoming, this disclosure proposes changing the AUD NAL unit semantics as follows. The access unit delimiter RBSP semantics are changed as follows (with underlined text being added and [[bracketed text]] being removed.

The access unit delimiter may be used to indicate the type of slices present in [[a]] all coded pictures in the access unit containing the access unit delimiter NAL unit and to simplify the detection of the boundary between access units. There is no normative decoding process associated with the access unit delimiter.

pic_type indicates that the slice_type values for all slices of the coded pictures in the access unit containing the access unit delimiter NAL unit are members of the set listed in Table 7-2 for the given value of pic_type. The value of pic_type shall be equal to 0, 1 or 2 in bitstreams conforming to this version of this Specification. Other values of pic_type are reserved for future use by ITU-T|ISO/IEC. Decoders conforming to this version of this Specification shall ignore reserved values of pic_type. The value of pic_type shall be equal to 0, 1, or 2 in bitstreams conforming to this version of this Specification. Other values of pic_type are reserved for future use by ITU-T|ISO/IEC. Decoders conforming to this version of this Specification shall ignore reserved values of pic_type.

TABLE 7-2

Interpretation of pic_type

| pic_type | slice_type values that may be present in the coded picture |
|---|---|
| 0 | I |
| 1 | P, I |
| 2 | B, P, I |

Alternatively, the semantics of pic_type may be modified such that the value of pic_type indicates that the slice_type values for all slices of the coded picture in the access unit with nuh_layer_id equal to the nuh_layer_id of the access unit delimiter NAL unit are members of the set listed in Table 7-2 for the given value of pic_type.

Existing implementations of multi-layer video coding also have some potential problems related to processing AUD NAL unit with nuh_layer_id equal to other than 0. For example, the HEVC version 1 specification has the following constraint:

When an access unit delimiter NAL unit is present, it shall be the first NAL unit. There shall be at most one access unit delimiter NAL unit in any access unit.

This constraint applies to the HEVC version 1 Specification. However, when a multi-layer bitstream contains AUD NAL units with nuh_layer_id greater than 0, such AUD NAL units should not be considered to be the beginning of a new access unit by a version 1 decoder. Failing to do so, the decoder would see empty access units as it would not recognize any NAL units that have nuh_layer_id greater than 0 and consider the bitstream as non-conforming even though the base layer of such a multi-layer bitstream may be otherwise decodable.

According to a technique of this disclosure, the constraint of the AUD NAL unit may be modified as follows (with underlined text being added):

When an access unit delimiter NAL unit with nuh_layer_id equal to 0 is present, it shall be the first NAL unit. There shall be at most one access unit delimiter NAL unit with nuh_layer_id equal to 0 in any access unit.

Alternatively, the constraint is modified as follows:

When an access unit delimiter NAL unit with nuh_layer_id equal to 0 is present, it shall be the first NAL unit. There shall be at most one access unit delimiter NAL unit in any access unit. Thus, according to the techniques of this disclosure, video encoder 20 may generate, for a first access unit, a first AUD NAL unit that have a layer identifier value (e.g. nuh_layer_id) value equal to zero and generate, for the first access unit, subsequent AUD NAL units that have layer identifiers greater than zero. Video decoder 30 may receive, for a first access unit, a first AUD NAL unit with a layer identifier equal to 0 and may receive, for the first access unit, subsequent AUD NAL units that have layer identifiers greater than zero. In the first access unit, the second AUD NAL unit follows the first AUD NAL unit and at least one VCL NAL unit.

Figure 2:
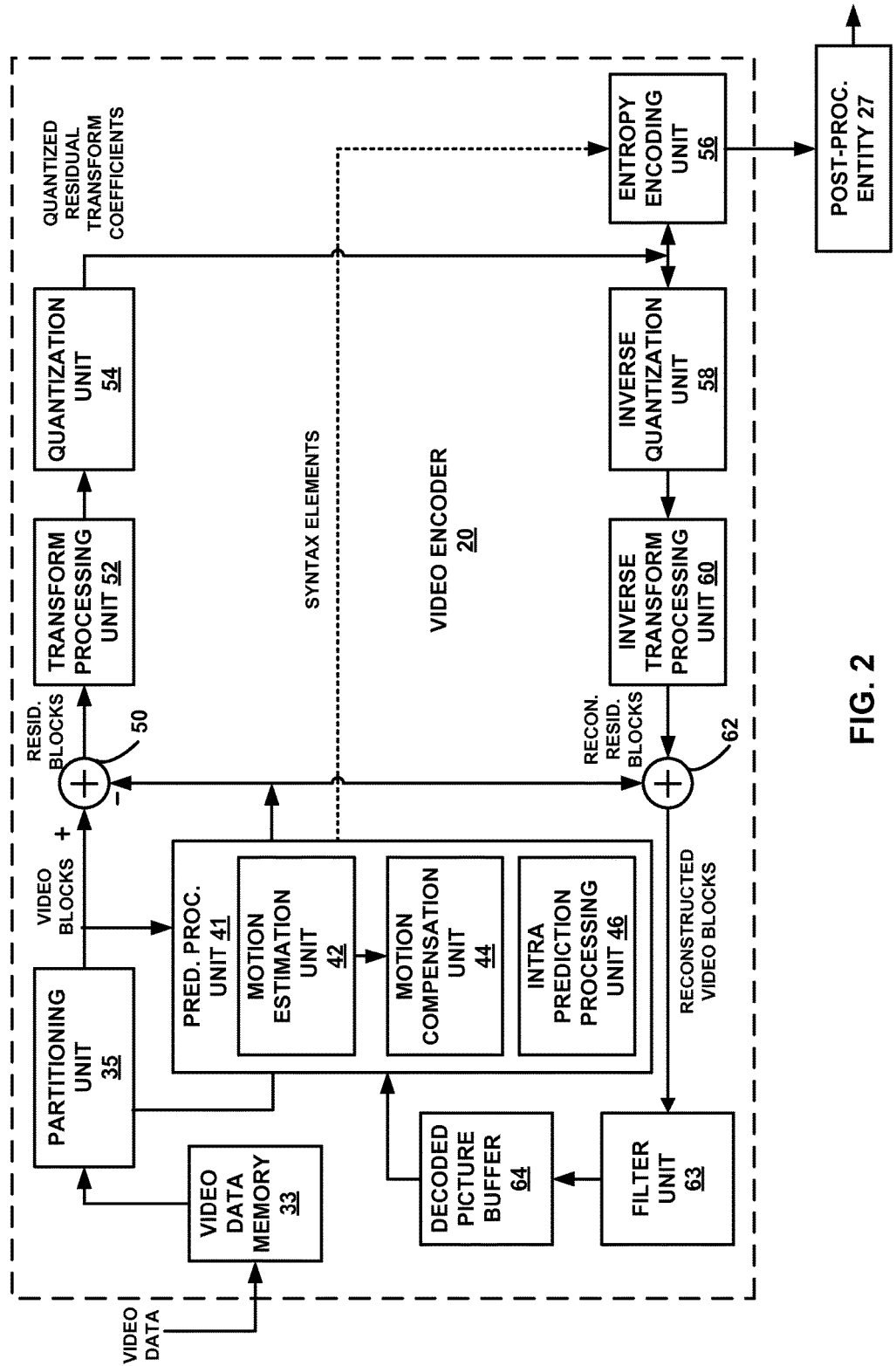
FIG. 2 is a block diagram illustrating an example video encoder that may implement the techniques described in this disclosure.

FIG. 2 is a block diagram illustrating an example video encoder 20 that may implement the techniques described in this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods Video encoder 20 may be configured to output video to post-processing entity 27, which is another example device that may implement the techniques described in this disclosure. Post-processing entity 27 is intended to represent an example of a video entity, such as a media aware network element (MANE), a splicing/editing device or another intermediate device that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 33, partitioning unit 35, prediction processing unit 41, filter unit 63, decoded picture buffer (DPB) 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

As shown in FIG. 2, video encoder 20 receives video data and stores the received video data in video data memory 33. Video data memory 33 may store video data to be encoded by the components of video encoder 20. The video data stored in video data memory 33 may be obtained, for example, from video source 18. DPB 64 may be a reference picture memory that stores reference video data for use in encoding video data by video encoder 20, e.g., in intra- or inter-coding modes. Video data memory 33 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 64 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64. The reference block may be used by motion estimation unit 42 and motion compensation unit 44 as a reference block to inter-predict a block in a subsequent video frame or picture.

According to aspects of this disclosure, video encoder 20 may be configured to determine that a supplemental enhancement information (SEI) message applies to more than one layer of the multi-layer video data and determine that the SEI message references a syntax element that has multiple instances associated with the more than one layer of the multi-layer video data. In such instances, video encoder 20 may set all of the multiple instances to a same value.

According to aspects of this disclosure, video encoder 20 may also be configured to generate a first VCL NAL unit for a first picture of an access unit. The first VCL NAL unit includes a first slice type. Video encoder 20 may generate a second VCL NAL unit for a second picture of the access unit. The second VCL NAL unit includes a second slice type. Video encoder 20 may generate an AUD NAL unit based on the first and second slice types.

Figure 3:
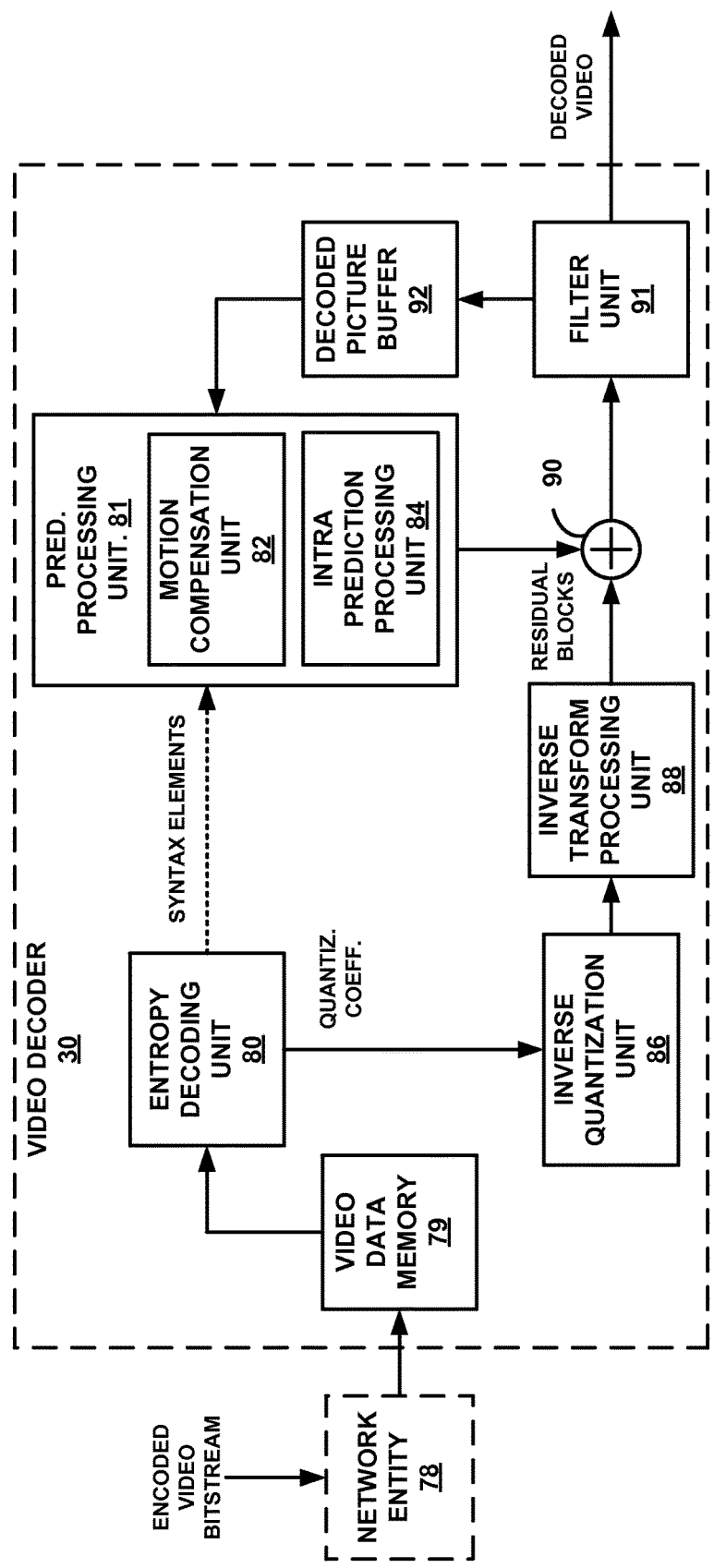
FIG. 3 is a block diagram illustrating an example video decoder that may implement the techniques described in this disclosure.

FIG. 3 is a block diagram illustrating an example video decoder 30 that may implement the techniques described in this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 80, prediction processing unit 81, inverse quantization unit 86, inverse transform processing unit 88, summer 90, filter unit 91, and reference picture memory 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from network entity 78. Network entity 78 may, for example, be a server, a MANE, a video editor/splicer, or other such device configured to implement one or more of the techniques described above. Network entity 78 may or may not include a video encoder, such as video encoder 20. Some of the techniques described in this disclosure may be implemented by network entity 78 prior to network entity 78 transmitting the encoded video bitstream to video decoder 30. In some video decoding systems, network entity 78 and video decoder 30 may be parts of separate devices, while in other instances, the functionality described with respect to network entity 78 may be performed by the same device that comprises video decoder 30.

During the decoding process, video decoder 30 receives an encoded video bitstream that represents video blocks of an encoded video slice and associated syntax elements from video encoder 20. Video decoder 30 stores the received encoded video bitstream in video data memory 79. Video data memory 79 may store video data, such as an encoded video bitstream, to be decoded by the components of video decoder 30. The video data stored in video data memory 79 may be obtained, for example, via link 16, from storage device 26, or from a local video source, such as a camera, or by accessing physical data storage media. Video data memory 79 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 79 and DPB 94 may be formed by any of a variety of memory devices, such as DRAM, SDRAM, MRAM, RRAM, or other types of memory devices. Video data memory 79 and DPB 94 may be provided by the same memory device or separate memory devices. In various examples, video data memory 79 may be on-chip with other components of video decoder 30, or off-chip relative to those components.

Entropy decoding unit 80 of video decoder 30 entropy decodes the video data stored in video data memory 79 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality.

Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

According to aspects of this disclosure, video decoder 30 may be configured to receive coded video data comprising a plurality of layers that includes a non-INBL) and an INBL. Video decoder 30 may receive VPS associated with the coded video data that includes first representation format parameters and receive a SPS associated with the INBL that includes second representation format parameters. Video decoder 30 may decode the non-INBL based on the first representation format parameters; and decode the INBL based on the second representation format parameters.

Figure 4:
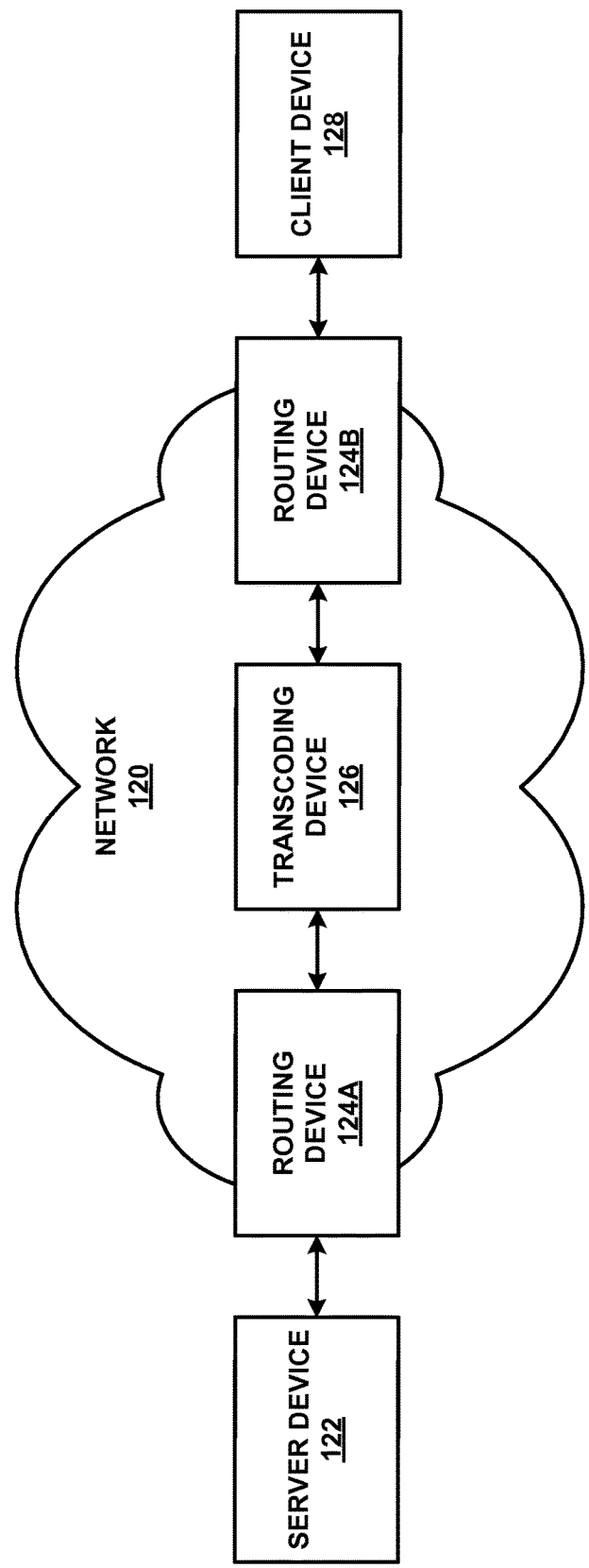
FIG. 4 is a block diagram illustrating one example network in which one or more aspects of this disclosure could be implemented.

FIG. 4 is a block diagram illustrating an example set of devices that form part of network 120. In this example, network 120 includes routing devices 124A, 124B (routing devices 124) and transcoding device 126. Routing devices 124 and transcoding device 126 are intended to represent a small number of devices that may form part of network 120. Other network devices, such as switches, hubs, gateways, firewalls, bridges, and other such devices may also be included within network 120. Moreover, additional network devices may be provided along a network path between server device 122 and client device 128. Server device 122 may correspond to source device 12 (FIG. 1), while client device 128 may correspond to destination device 14 (FIG. 1), in some examples.

In general, routing devices 124 implement one or more routing protocols to exchange network data through network 120. In some examples, routing devices 124 may be configured to perform proxy or cache operations. Therefore, in some examples, routing devices 124 may be referred to as proxy devices. In general, routing devices 124 execute routing protocols to discover routes through network 120. By executing such routing protocols, routing device 124B may discover a network route from itself to server device 122 via routing device 124A. One or more of routing devices 124 may comprise a MANE that uses one or more aspects of this disclosure.

For example, the MANE may be configured to receive coded video data that includes a plurality of layers including a non-INBL and an INBL. The MANE may receive a VPS associated with the coded video data that includes first representation format parameters. The MANE may receive a SPS associated with the INBL that includes second representation format parameters. The MANE may process the non-INBL based on the first representation format parameters and process the INBL based on the second representation format parameters. As part of processing the INBL based on the second representation format parameters comprises, the MANE may rewrite the INBL to be a base layer based on the second representation format parameters. As part of the rewriting process, the MANE transcodes (or transforms) the INBL into a base layer that is, for example, compatible with HEVC version 1. The MANE receives the INBL as an input and transmits the output to an HEVC version 1 decoder.

The techniques of this disclosure may be implemented by network devices such as routing devices 124 and transcoding device 126, but also may be implemented by client device 128. In this manner, routing devices 124, transcoding device 126, and client device 128 represent examples of devices configured to perform the techniques of this disclosure. Moreover, the devices of FIG. 1, and video encoder 20 illustrated in FIG. 2 and video decoder 30 illustrated in FIG. 3, are also exemplary devices that can be configured to perform the techniques of this disclosure.

Figure 5:
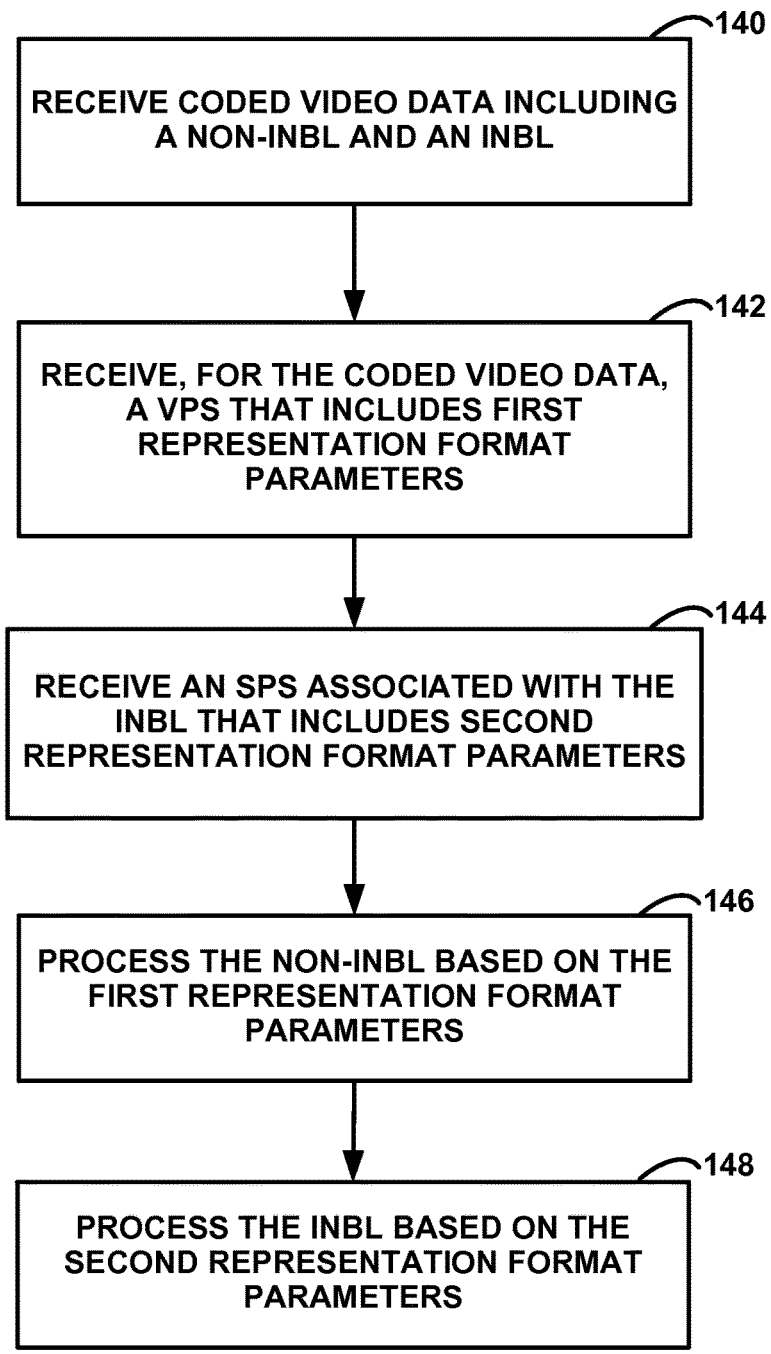
FIG. 5 is a flowchart showing an example method in accordance with the techniques of this disclosure.

FIG. 5 is a flowchart showing a method of processing multi-layer video data in accordance with the techniques of this disclosure. The techniques of FIG. 5 will be described with respect to a generic video processing device. The video processing device may, for example, correspond to a video processing device such as post-processing entity 27, network entity 78, video decoder 30, routing devices 124, or transcoding device 126. The video processing device receives coded video data include a non-INBL and an INBL (140). The video processing devices receives, for the coded video data, a VPS that includes first representation format parameters (142). The video processing devices receive an SPS associated with the INBL that includes second representation format parameters (144). The video processing devise processes the non-INBL based on the first representation format parameters (146) and processes the INBL based on the second representation format parameters (148). At least one value of a representation format parameter of the first representation format parameters may be different than at least one value of a representation format parameter of the second representation format parameters.

If the video processing device is a MANE, the video processing device may process the INBL based on the second representation format parameters by rewriting the INBL to be a base layer based on the second representation format parameters. The INBL may have a layer identification (e.g. nuh_layer_id) greater than zero, and as part of rewriting the INBL, the video processing device may set a layer identification of the INBL to 0, thus creating a base layer with a layer identification equal to 0. The base layer rewritten from the INBL may be decodable by an HEVC version 1 decoder that does not support multi layer video.

If the video processing device is a video decoder, the video processing device may processing the INBL based on the second representation format parameters by decoding the INBL. After decoding the INBL, the video decoder may output or display decoded video based on the INBL and the non-INBL.

Figure 6:
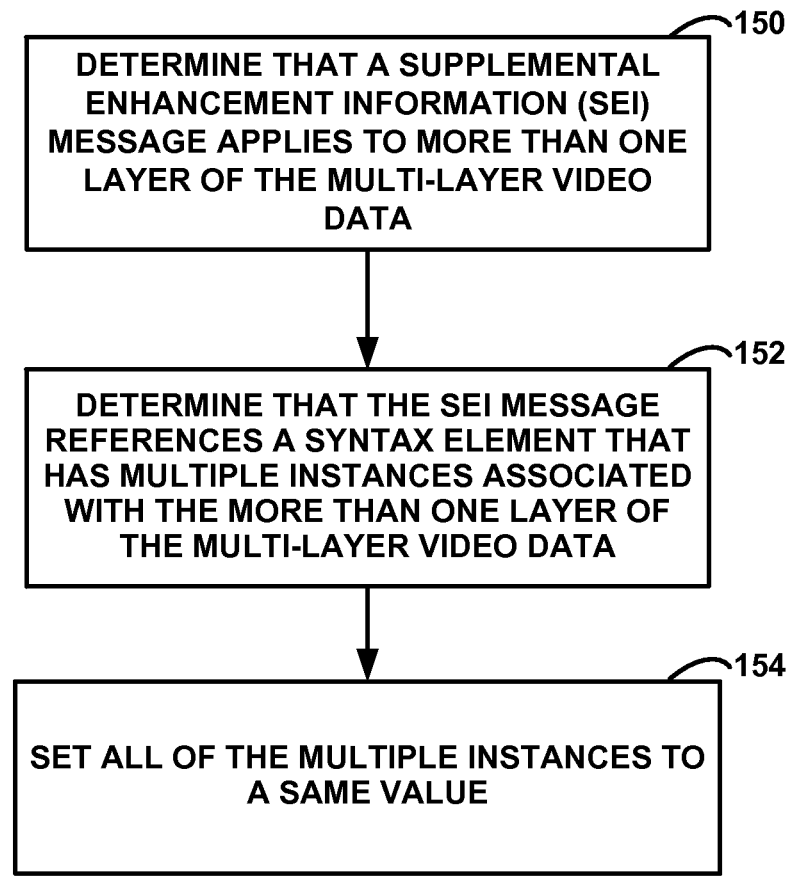
FIG. 6 is a flowchart showing an example method in accordance with the techniques of this disclosure.

FIG. 6 is a flowchart showing a method of encoding multi-layer video data in accordance with the techniques of this disclosure. The techniques of FIG. 6 will be described with respect to video encoder 20. Video encoder 20 determines that an SEI message applies to more than one layer of the multi-layer video data (150). Video encoder 20 determines that the SEI message references a syntax element that has multiple instances associated with the more than one layer of the multi-layer video data (152). In response to the SEI message referencing a syntax element that has multiple instances associated with the more than one layer of the multi-layer video data, video encoder 20 sets all of the multiple instances to a same value (154). The multiple instances of the syntax element may include a first instance of the syntax element in a first sequence parameter set associated with a first layer of the multi-layer video data and a second instance of the syntax element in a second sequence parameter set associated with a second layer of the multi-layer video data. The syntax element may be any of a field_seq_flag syntax element, a general_progressive_source_flag syntax element, or a general_interlaced_source_flag syntax element.

Figure 7:
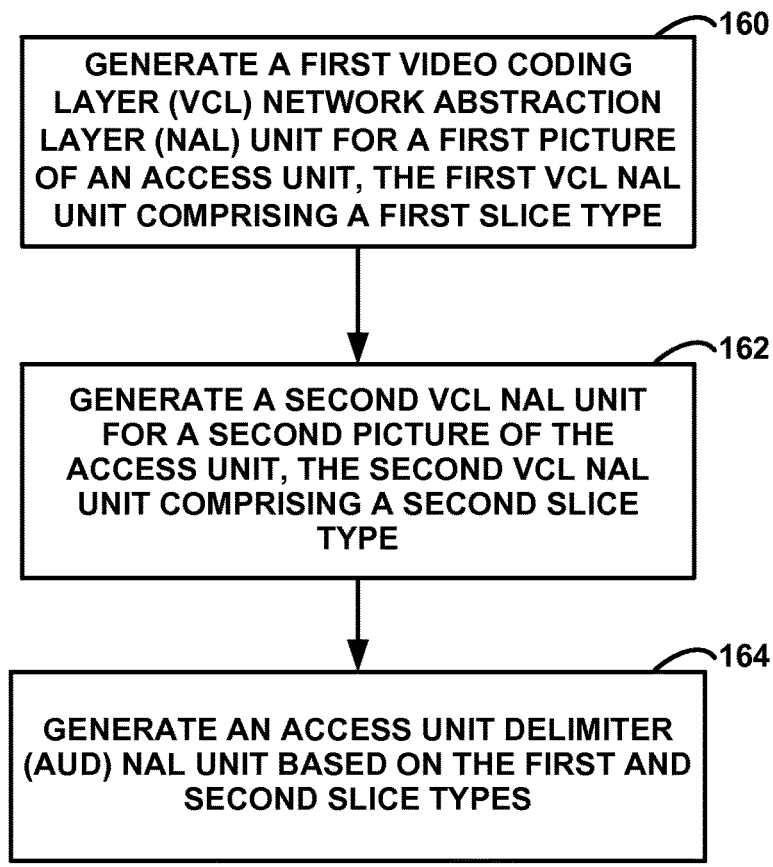
FIG. 7 is a flowchart showing an example method in accordance with the techniques of this disclosure.

FIG. 7 is a flowchart showing a method of encoding multi-layer video data in accordance with the techniques of this disclosure. The techniques of FIG. 7 will be described with respect to video encoder 20. Video encoder 20 generates a first VCL NAL unit for a first picture of an access unit (160). The first VCL NAL unit includes a first slice type. Video encoder 20 generates a second VCL NAL unit for a second picture of the access unit (162). The second VCL NAL unit includes a second slice type. Video encoder 20 generates an AUD NAL unit based on the first and second slice types (164).

Video encoder 20 may generate the AUD NAL unit by indicating in the AUD NAL unit a picture type syntax element that indicates that the access unit includes both the first slice type and the second slice type. The first AUD NAL unit may be used to identify a boundary between the access unit and a preceding access unit. The AUD NAL unit may additionally or alternatively be used to indicate a picture type for all pictures in the access unit. The first slice type and the second slice type may be selected from the group consisting of an I slice, a P slice, and a B slice, or the first slice type and the second slice type may be selected from the group consisting of an I slice and a P slice.

Figure 8:
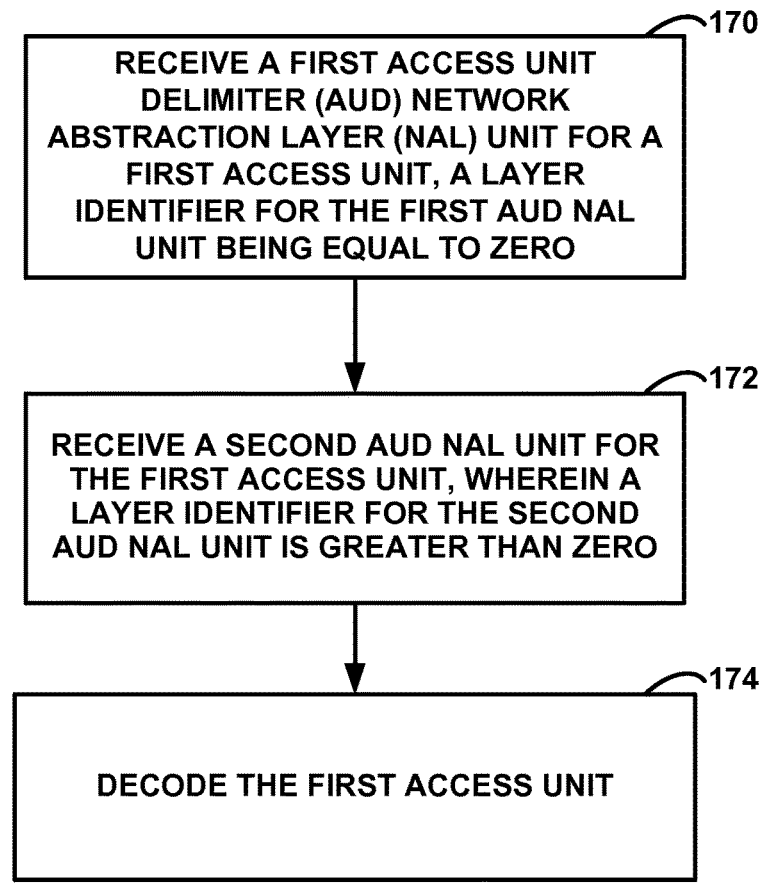
FIG. 8 is a flowchart showing an example method in accordance with the techniques of this disclosure.

FIG. 8 is a flowchart showing a method of encoding multi-layer video data in accordance with the techniques of this disclosure. The techniques of FIG. 8 will be described with respect to video decoder 30. Video decoder 30 receives a first AUD NAL unit for a first access unit (170). A layer identifier for the first AUD NAL unit is equal to zero. Video decoder 30 receives a second AUD NAL unit for the first access unit (172). A layer identifier for the second AUD NAL unit is greater than zero. Video decoder 30 decodes the first access unit (174).

The second AUD NAL unit in the first access unit may follow, in decoding order, the first AUD NAL unit and at least one video coding layer (VCL) NAL unit in the first access unit. The first AUD NAL unit may be a first NAL unit, in decoding order, in the first access unit. The first AUD NAL unit may identify a boundary between the first access unit and a preceding access unit. In some examples, no other AUD NAL unit in the first access unit other than the first AUD NAL unit may have a layer identifier equal to zero.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding multi-layer video data, the method comprising:
    determining that a supplemental enhancement information (SEI) message applies to more than one layer of the multi-layer video data;
    determining that the SEI message references a syntax element that has multiple instances associated with the more than one layer of the multi-layer video data, wherein the multiple instances of the syntax element comprise a first instance of the syntax element in a first active sequence parameter set syntax structure associated with a first layer of the multi-layer video data and a second instance of the syntax element in a second active sequence parameter set syntax structure associated with a second layer of the multi-layer video data; and setting all of the multiple instances of the syntax element to a same value.

2. The method of claim 1, wherein a value of the syntax element indicates if a coded video sequence of the multi-layer video data includes frames or fields.

3. The method of claim 1, wherein a value of the syntax element indicates a source scan type for a coded video sequence of the multi-layer video data.

4. The method of claim 1, wherein the syntax element comprises a field_seq_flag syntax element.

5. The method of claim 1, wherein the syntax element comprises a general_progressive_source_flag syntax element.

6. The method of claim 1, wherein the syntax element comprises a general_interlaced_source_flag syntax element.

7. The method of claim 1, further comprising:
storing the multi-layer video data in a memory of a wireless communication device;
processing the multi-layer video data on one or more processors of the wireless communication device; and
transmitting the multi-layer video data from a transmitter of the wireless communication device.

8. The method of claim 7, wherein the wireless communication device comprises a telephone handset and wherein transmitting the video data at the transmitter of the wireless communication device comprises modulating, according to a wireless communication standard, a signal comprising the video data.

9. The method of claim 1, further comprising:
encoding the first active sequence parameter set and the second active sequence parameter set in accordance with a restriction, wherein the restriction requires all of the multiple instances of the syntax elements to have the same value, wherein encoding the first active sequence parameter set and the second active sequence parameter set in accordance with the restriction further comprises setting all of the multiple instances of the syntax element to the same value.

10. A device for encoding video data, the device comprising:
a memory configured to store at least a portion of a multi-layer bitstream of video data; and
one or more processors configured to:
determine that a supplemental enhancement information (SEI) message applies to more than one layer of the multi-layer video data;
determine that the SEI message references a syntax element that has multiple instances associated with the more than one layer of the multi-layer video data, wherein the multiple instances of the syntax element comprise a first instance of the syntax element in a first active sequence parameter set syntax structure associated with a first layer of the multi-layer video data and a second instance of the syntax element in a second active sequence parameter set syntax structure associated with a second layer of the multi-layer video data; and
set all of the multiple instances of the syntax element to a same value.

11. The device of claim 10, wherein a value of the syntax element indicates if a coded video sequence of the multi-layer video data includes frames or fields.

12. The device of claim 10, wherein a value of the syntax element indicates a source scan type for a coded video sequence of the multi-layer video data.

13. The device of claim 10, wherein the syntax element comprises a field_seq_flag syntax element.

14. The device of claim 10, wherein the syntax element comprises a general_progressive_source_flag syntax element.

15. The device of claim 10, wherein the syntax element comprises a general_interlaced_source_flag syntax element.

16. The device of claim 10, wherein the device is a wireless communication device, further comprising;
a transmitter configured to transmit the multi-layer video data.

17. The device of claim 16, wherein the wireless communication device comprises a mobile network device, and wherein the transmitter is configured to transmit the multi-layer video data as modulated data according to a cellular communication standard.

18. The device of claim 10, wherein the one or more processors are further configured to:
encode the first active sequence parameter set and the second active sequence parameter set in accordance with a restriction, wherein the restriction requires all of the multiple instances of the syntax elements to have the same value, wherein to encode the first active sequence parameter set and the second active sequence parameter set in accordance with the restriction further, the one or more processors are further configured to set all of the multiple instances of the syntax element to the same value.

19. An apparatus for encoding multi-layer video data, the apparatus comprising:
means for determining that a supplemental enhancement information (SEI) message applies to more than one layer of the multi-layer video data;
means for determining that the SEI message references a syntax element that has multiple instances associated with the more than one layer of the multi-layer video data, wherein the multiple instances of the syntax element comprise a first instance of the syntax element in a first active sequence parameter set syntax structure associated with a first layer of the multi-layer video data and a second instance of the syntax element in a second active sequence parameter set syntax structure associated with a second layer of the multi-layer video data; and
means for setting all of the multiple instances of the syntax element to a same value.

20. The apparatus of claim 19, wherein a value of the syntax element indicates if a coded video sequence of the multi-layer video data includes frames or fields.

21. The apparatus of claim 19, wherein a value of the syntax element indicates a source scan type for a coded video sequence of the multi-layer video data.

22. The apparatus of claim 19, wherein the syntax element comprises a field_seq_flag syntax element.

23. The apparatus of claim 19, further comprising:
means for encoding the first active sequence parameter set and the second active sequence parameter set in accordance with a restriction, wherein the restriction requires all of the multiple instances of the syntax elements to have the same value, wherein the means for encoding the first active sequence parameter set and the second active sequence parameter set in accordance with the restriction further comprises the means for setting all of the multiple instances of the syntax element to the same value.

24. A non-transitory computer readable storage medium storing instructions that when executed by one or more processors cause the one or more processors to:
  determine that a supplemental enhancement information (SEI) message applies to more than one layer of the multi-layer video data;
  determine that the SEI message references a syntax element that has multiple instances associated with the more than one layer of the multi-layer video data, wherein the multiple instances of the syntax element comprise a first instance of the syntax element in a first active sequence parameter set syntax structure associated with a first layer of the multi-layer video data and a second instance of the syntax element in a second active sequence parameter set syntax structure associated with a second layer of the multi-layer video data; and
  set all of the multiple instances of the syntax element to a same value.

25. The non-transitory computer readable storage medium of claim 24, wherein a value of the syntax element indicates if a coded video sequence of the multi-layer video data includes frames or fields.

26. The non-transitory computer readable storage medium of claim 24, wherein a value of the syntax element indicates a source scan type for a coded video sequence of the multi-layer video data.

27. The non-transitory computer readable storage medium of claim 24, wherein the syntax element comprises a field_seq_flag syntax element.

28. The non-transitory computer readable storage medium of claim 24, wherein the syntax element comprises a general_progressive_source_flag syntax element.

29. The non-transitory computer readable storage medium of claim 24, wherein the syntax element comprises a general_interlaced_source_flag syntax element.

30. The non-transitory computer readable storage medium of claim 24, storing further instructions that when executed cause the one or more processors to:
  encode the first active sequence parameter set and the second active sequence parameter set in accordance with a restriction, wherein the restriction requires all of the multiple instances of the syntax elements to have the same value, wherein to encode the first active sequence parameter set and the second active sequence parameter set in accordance with the restriction, the instructions cause the one or more processors to set all of the multiple instances of the syntax element to the same value.

* * * * *